(12) United States Patent
Quach

(10) Patent No.: US 7,164,492 B2
(45) Date of Patent: Jan. 16, 2007

(54) AUTOMATIC FACSIMILE DOCUMENT RESIZING

(75) Inventor: Tony T. Quach, Anaheim, CA (US)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1010 days.

(21) Appl. No.: 10/093,052

(22) Filed: Mar. 7, 2002

(65) Prior Publication Data

US 2003/0174365 A1    Sep. 18, 2003

(51) Int. Cl.
*H04N 1/387* (2006.01)

(52) U.S. Cl. .............. 358/1.18; 358/449; 358/451

(58) Field of Classification Search .......... 358/1.2, 358/1.13, 1.15, 1.1, 449, 439, 434, 1.18, 358/451; 382/293, 298, 300, 297

See application file for complete search history.

(56) References Cited

U.S. PATENT DOCUMENTS

| | | | |
|---|---|---|---|
| 4,710,886 A | 12/1987 | Heath | |
| 4,943,936 A | 7/1990 | Hirai et al. | |
| 5,008,709 A | 4/1991 | Shinada et al. | |
| 5,058,038 A | 10/1991 | Motoyama et al. | |
| 5,097,417 A | 3/1992 | Ukon | |
| 5,121,468 A | 6/1992 | Daino | |
| 5,175,634 A | 12/1992 | Matsuzaki | |
| 5,196,943 A | 3/1993 | Hersee et al. | |
| 5,204,758 A | 4/1993 | Sakamoto | |
| 5,220,431 A | 6/1993 | Yamagguchi | |
| 5,265,209 A | 11/1993 | Kageyama et al. | |
| 5,267,047 A | 11/1993 | Argenta et al. | |
| 5,287,199 A | 2/1994 | Zoccolillo | |
| 5,412,483 A | 5/1995 | Ludlow et al. | |
| 5,428,459 A | 6/1995 | Asai | |
| 5,438,433 A | 8/1995 | Reifman et al. | |
| 5,448,346 A | 9/1995 | Tabata | |
| 5,493,635 A | 2/1996 | Brindle et al. | |
| 5,504,843 A | 4/1996 | Catapano et al. | |
| 5,537,518 A | 7/1996 | Hasegawa | |
| 5,537,550 A | 7/1996 | Russell et al. | |
| 5,537,626 A | 7/1996 | Kraslavsky et al. | |
| 5,563,713 A | 10/1996 | Sugiura | |
| 5,610,728 A * | 3/1997 | Sobue | 358/449 |
| 5,613,160 A | 3/1997 | Kraslavsky et al. | |
| 5,621,539 A | 4/1997 | Brown et al. | |
| 5,625,466 A | 4/1997 | Nakajima | |
| 5,638,495 A | 6/1997 | Arai | |
| 5,642,205 A | 6/1997 | Kassmann | |
| 5,671,463 A | 9/1997 | Morikawa et al. | |
| 5,694,618 A | 12/1997 | Hibino | |
| 5,712,712 A | 1/1998 | Sayward | |
| 5,719,685 A | 2/1998 | Kimura et al. | |
| 5,732,196 A | 3/1998 | Watanabe | |

(Continued)

*Primary Examiner*—Douglas Q. Tran
*Assistant Examiner*—Chan S. Park
(74) *Attorney, Agent, or Firm*—Tucker Ellis & West LLP

(57) ABSTRACT

A source document auto-resizing algorithm in a facsimile-capable device. When a user inputs the source document into the facsimile-capable device, the source document is converted into an intermediate converted document with the resizing algorithm resident in the facsimile-capable device. The intermediate converted document is then transmitted to a destination device having predetermined output capabilities, which intermediate converted document is processed into an output document by the destination device in accordance with the predetermined output capabilities.

27 Claims, 3 Drawing Sheets

U.S. PATENT DOCUMENTS

| | | | |
|---|---|---|---|
| 5,732,403 A | 3/1998 | Nakamura | |
| 5,734,760 A | 3/1998 | Yoshida | |
| 5,784,177 A | 7/1998 | Sanchez et al. | |
| 5,835,920 A | 11/1998 | Horton | |
| 5,839,019 A * | 11/1998 | Ito | 399/45 |
| 5,860,073 A | 1/1999 | Ferrel et al. | |
| 5,911,037 A | 6/1999 | Yoshida | |
| 5,923,826 A | 7/1999 | Grzenda et al. | |
| 5,930,005 A | 7/1999 | Yoshida | |
| 5,956,737 A | 9/1999 | King et al. | |
| 5,961,226 A | 10/1999 | Nishida | |
| 5,973,791 A | 10/1999 | Yamamuro et al. | |
| 5,995,986 A | 11/1999 | Ueda et al. | |
| 6,023,714 A | 2/2000 | Hill et al. | |
| 6,028,982 A | 2/2000 | Toyoda et al. | |
| 6,076,120 A | 6/2000 | Hatayama | |
| 6,088,138 A | 7/2000 | Sakai et al. | |
| 6,088,702 A | 7/2000 | Plantz et al. | |
| 6,108,676 A | 8/2000 | Nakatsuyama | |
| 6,141,705 A | 10/2000 | Anand et al. | |
| 6,144,974 A | 11/2000 | Gartland | |
| 6,161,114 A | 12/2000 | King et al. | |
| 6,163,784 A | 12/2000 | Taguchi | |
| 6,172,763 B1 | 1/2001 | Toyoda et al. | |
| 6,178,005 B1 * | 1/2001 | Yoshida | 358/1.18 |
| 6,208,427 B1 | 3/2001 | Lee | |
| 6,208,638 B1 * | 3/2001 | Rieley et al. | 370/354 |
| 6,243,721 B1 | 6/2001 | Duane et al. | |
| 6,247,028 B1 | 6/2001 | Torisaki | |
| 6,247,135 B1 | 6/2001 | Feague | |
| 6,269,380 B1 | 7/2001 | Terry et al. | |
| 6,275,622 B1 * | 8/2001 | Krtolica | 382/296 |
| 6,327,387 B1 | 12/2001 | Naoi et al. | |
| 6,327,599 B1 | 12/2001 | Warmus et al. | |
| 6,330,071 B1 | 12/2001 | Vidyanand | |
| 6,338,076 B1 | 1/2002 | Hidding et al. | |
| 6,343,197 B1 | 1/2002 | Serizawa et al. | |
| 6,343,846 B1 * | 2/2002 | Asano | 347/14 |
| 6,563,598 B1 * | 5/2003 | Johnson et al. | 358/1.15 |
| 6,621,599 B1 * | 9/2003 | Newell | 358/474 |
| 2002/0044308 A1 * | 4/2002 | Sekiya et al. | 358/509 |
| 2006/0023263 A1 * | 2/2006 | Asahi | 358/403 |

* cited by examiner

AUTOMATIC FACSIMILE DOCUMENT RESIZING

BACKGROUND OF THE INVENTION

1. Technical Field of the Invention

This invention is related to facsimile devices, and more particularly to a device having such a function that contains an algorithm for adjusting an input document before being transmitted therefrom.

2. Background of the Related Art

Facsimile devices ("fax machines"), whether traditional single-purpose machines dedicated only for faxing documents, or more recent multi-function peripheral devices that accommodate a number of different services, retain a time-consuming and counter-productive aspect of requiring the sender to consider adjusting the source paper size to accommodate the destination device, since most traditional fax devices accommodate only A4 and 8.5×11 paper sizes. Such an aspect causes problems when a document that is to be transmitted from the source facsimile device is of an a typical dimension. For example, if source user were to copy a page from a book on such a multi-function device, and direct that the page be transmitted via fax to a recipient user at the destination fax machine, the resulting output document can be unreadable since the orientation is incorrect, paper size incorrect, etc.

What is needed is an conversion algorithm that automatically ascertains the dimensions of the source document, makes the conversion to a conventional and typical paper size, and transmits the document, so that the sending user need not have to waste time adjusting paper parameters at the source, and the recipient does not need to configure the corresponding paper size at the destination device.

SUMMARY OF THE INVENTION

The present invention disclosed and claimed herein, in one aspect thereof, comprises a source document auto-resizing algorithm in a facsimile-capable device. When a user inputs the source document into the facsimile-capable device, the source document is converted into an intermediate converted document with the resizing algorithm resident in the facsimile-capable device. The intermediate converted document is then transmitted to a destination device having predetermined output capabilities, which intermediate converted document is processed into an output document by the destination device in accordance with the predetermined output capabilities.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

Figure 1A:
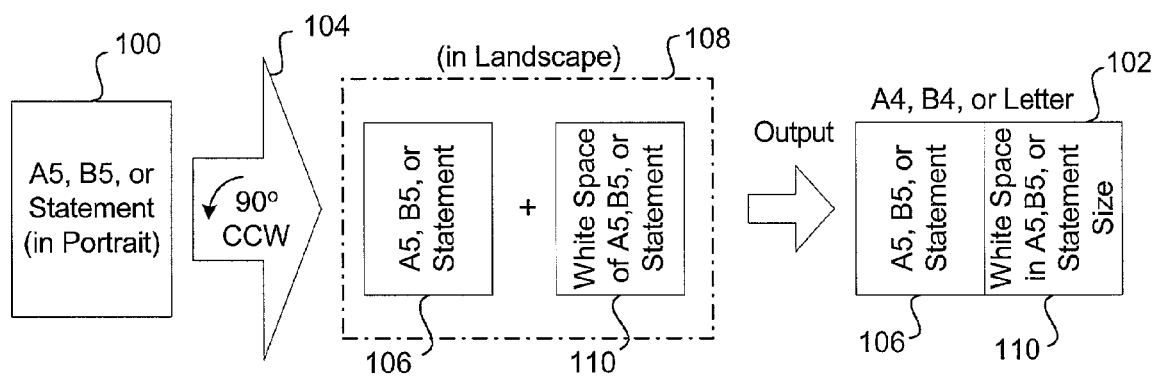
FIG. 1 illustrates a block flow diagram of the conversion of a portrait source document into a format compatible with the desired output document.

The disclosed invention describes architecture for handling paper-size incongruities between a source document to be transmitted and the recipient facsimile ("fax") device. For example, small paper sizes such as those smaller than A4, B4, Letter (or Statement) sizes, pose compatibility problems with most conventional receiving fax devices. The architecture described herein facilitates conversion of a fax document in ISO (International Organization for Standardization) and North American paper sizes to corresponding sizes in ISO and North American. For example, A5, B5, or Statement paper size can be resized to A4, B4, or Letter paper size before faxing to the recipient fax device.

Conventional fax machine architecture, for example, places A5, B5, or Statement document sizes into a portrait format of respective paper sizes A4, B4, or Letter, regardless of the orientation of the source document. Alternatively, the conventional recipient fax machine resizes A5, B5, or Statement formats to A4, B4, or Letter, respectively, placing a burden in time and expense at the output so that the recipient needs more time and toner to print the output fax document.

The disclosed architecture solves this problem by maintaining the fax document in its original size at the source, and converting the fax document at the source to the required output paper size before transmission utilizing conversion criteria provided in a table, for example, the following Table 1. In general, the smaller source document is converted to a larger output document format. The upward conversion can include a variety of types of smaller source documents sized to fit larger output document formats, other than ×5-to-×4 conversion described herein.

TABLE 1

Source Fax Document Conversion Parameters

| Source document paper size | Rotate | Add white space | Output document paper size |
|---|---|---|---|
| A5 portrait | 90 degree | A5 landscape | A4 portrait |
| A5 landscape | No | A5 landscape | A4 portrait |
| B5 portrait | 90 degree | B5 landscape | B4 portrait |
| B5 landscape | No | B5 landscape | B4 portrait |
| Statement portrait | 90 degree | Statement landscape | Letter portrait |
| Statement landscape | No | Statement landscape | Letter portrait |

As indicated in Table 1, the conversion is a one-to-one conversion from the source document type to the output document paper type. For example, where the source document is type A, the output document is also type A; where the source document is type B, the output document is also type B; and where the source document is type Statement, the output document is type Letter.

As indicated hereinabove, the information of Table 1 can be contained in the form of a look-up table stored in a non-volatile memory, such as PROM (Programmable Read-Only Memory), having a variety of programmable input, such as erasable, electronically erasable, etc. Alternatively, the software facilitating such a process can be stored on a local mass storage device, e.g., hard drive, and automatically retrieved upon start-up of a controller machine operating to provide the fax function, and executed in a fast memory, e.g., flash, SDRAM, etc., utilized for controlling on-board functions of the controller machine. Such storage techniques facilitate converter algorithm table updating where needed.

To provided some background related to paper sizes, the paper formats defined by ISO in the A, B and C series are used today in nearly all countries, apart from North America. The formats have been determined according to the following rules: A0 has an area of one square meter; the aspect ratio of all members of the A, B and C-series is sqrt(2)=1.41421; the next higher format (i.e., from A5 to A4) is obtained by cutting the paper in two equal pieces parallel to the shorter side, resulting again in a sqrt(2) format; the size of a B-series paper is the geometric mean between the size of the corresponding A-series paper and the next bigger A-series paper (e.g., B1 is between A1 and A0); and, the size of a C-series paper is the geometric mean between the size of the A-series and B-series paper with the same number. Larger sizes have smaller numbers.

The following Table 2 lists the official definitions of the paper sizes which are the values utilizing the above rules rounded more-or-less to an integral number of millimeters.

TABLE 2

ISO Paper Sizes.

| A0 841 × 1189 | B0 1000 × 1414 | C0 917 × 1297 |
| A1 594 × 841 | B1 707 × 1000 | C1 648 × 917 |
| A2 420 × 594 | B2 500 × 707 | C2 458 × 648 |
| A3 297 × 420 | B3 353 × 500 | C3 324 × 458 |
| A4 210 × 297 | B4 250 × 353 | C4 229 × 324 |
| A5 148 × 210 | B5 176 × 250 | C5 162 × 229 |
| A6 105 × 148 | B6 125 × 176 | C6 114 × 162 |
| A7 74 × 105 | B7 88 × 125 | C7 81 × 114 |
| A8 52 × 74 | B8 62 × 88 | C8 57 × 81 |
| A9 37 × 52 | B9 44 × 62 | C9 40 × 57 |
| A10 26 × 37 | B10 31 × 44 | C10 28 × 40 |

The most popular sizes are perhaps: A0, for technical drawings; A4 for letters, magazines, and documents; A5 for books; C4, C5, C6 envelopes; and B4, A3 which are supported by many copy machines, and newspapers.

Referring now to FIG. 1a, there is illustrated a block flow diagram of the conversion of a portrait source document 100 into a format compatible with the desired output document 102. In this particular embodiment, the process begins by a user inputting the source document data into the system via input means (manually by a receiving apparatus, or electronically via a network) so that it can be rasterized into a source document image 100. The source document image 100 is in a smaller document series format, e.g., A5, B5, or Statement received at the controller (not shown) from the client user who wants to transmit the source document to a recipient fax machine (not shown) either locally or at a remote destination. Thus source document data is provided to ascertain the characteristics of the source document image 100, such as page orientation, text orientation on the page, and page size. The source document data includes text data, image data, or both text and image data that is generated from the client driver through a network or directly into the document receiving apparatus of the controller. If the source document data contains document information indicating that the source document is an ×5 document image with text orientated in portrait, and the corresponding output document 102 is designated to be an ×4 format, according the conversion information of Table 1, the disclosed process includes rasterizing the source document into the source document image 100, and rotating the rasterized image 100 ninety degrees counterclockwise (CCW), as indicated by the interstitial process arrow process 104 to generate a rotated image 106. The rotated image 106 is then copied into an intermediate output document file 108 as part of the configuration process for developing the output format. To meet the required size for the output document 102, white space image information 110 equal to the dimensions of the rotated image 106 is then appended to the rotated image 106 of the intermediate document 108 to complete the amount of image information needed to provide the corresponding size of the output document 102. This is illustrated by the output document 102 including the rotated image information 106 and the white space image 110, all in a landscape output format.

Figure 1B:
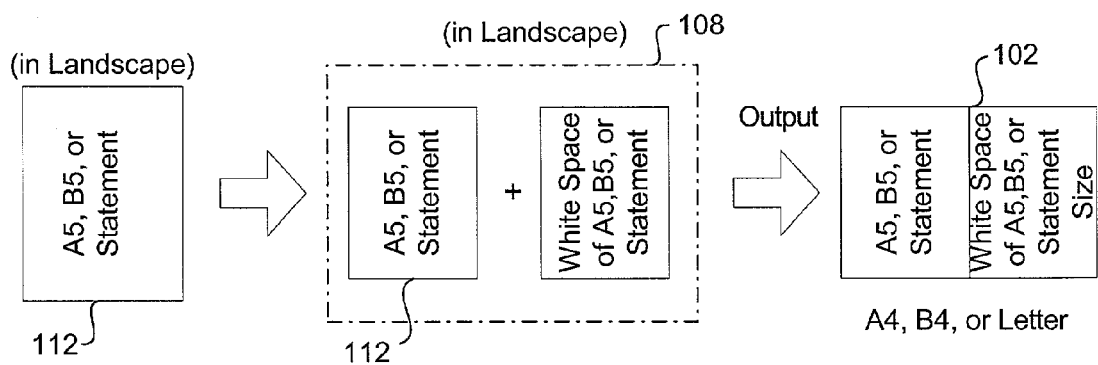

Referring now to FIG. 1b, there is illustrated a block flow diagram of the conversion of a landscape source document image 112 into a format compatible with the desired output document 102. In this illustration, the source document image 112 does not need to be rotated, since it is already in a landscape format. Thus including the source document image 112 directly into the intermediate document 108, and then appending the white space image 108 is suitable for completing the intermediate document 108 compatible for the requirements of the output document 102.

Figure 2:
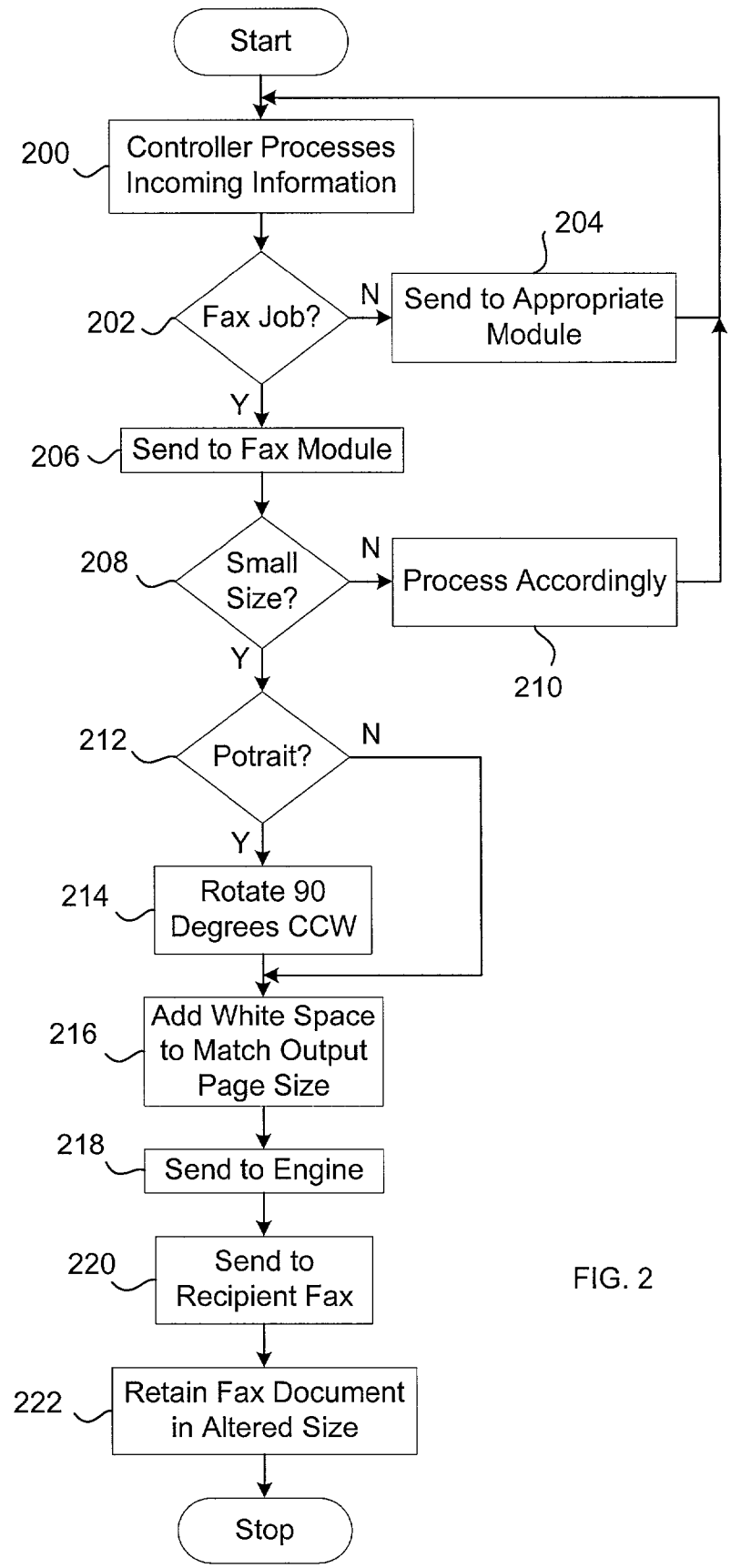
FIG. 2 illustrates a block flow diagram of the conversion of a landscape source document image into a format compatible with the desired output document.

Referring now to FIG. 2, there is illustrated a flow chart of the conversion process. Flow begins at a Start block and proceeds to a function block 200 where the controller processes the incoming job information. Flow is to a decision block 202 to determine if the job information is a fax job. If not, flow is out the "N" path back to the input of function block 200 to process the next set of job information. If the received information is a fax job, flow is out the "Y" path to a function block 206 to send the job to the fax module. In a decision block 208, the source document image 100 is analyzed to determine its dimensions. If it is not a small enough document (or document image), flow is out the "N" path to a function block 210 to process the document according to normal procedures. Flow then loops back to the input of function block 200 to process the next job. If the source document image 100 has the appropriate dimensions suitable for use according to the table information of the controller, flow is out the "Y" path of decision block 208 to another decision block 210 to determine if the source document image 100 is in portrait orientation. If so, flow is out the "Y" path to a function block 214 to rotate the image ninety degrees in the counterclockwise direction in preparation for import into the intermediate document 108. In a function block 216, the white space image 110 is appended to the rotated image 106 of the source document image 100 to match the required size of the output document 102. However, if the source document image 112 is already in landscape format, flow is out the "N" path jumping forward to the function block 216 to add the white space 110 to the intermediate document 108. The intermediate document 108 is then sent to the output engine, as indicated in flow to a function block 218. The engine then sends the intermediate document 108 to the recipient fax machine for output. The controller also retains a copy of the intermediate document 108 for other uses, as indicated in a function block 222. Flow then reaches a Stop block.

In manual operation, when the user manually inserts such source document 100 into the document receiving apparatus of the controller, the controller senses the source document 100 dimensions and text orientation, and calls the conversion program to make the appropriate conversion to the format of the output document 102. The format of the output document 102 in the look-up table is selected as that which is capable of being output by most, if not all, recipient fax machines. According to the parameters provided in the foregoing look-up table, the source document 100 in the format of an ×5 document ("x" used as a field holder for all documents of type 5) is stipulated for conversion to an ×4 document. Once the conversion is completed, the resulting output document information is transmitted to the recipient fax machine in the form of output document data. The recipient fax machine processes the received output document data and either outputs the output document 102 in hard copy format, or stores it as an electronic file that can be stored for later retrieval, e.g., by a designated user. The source document data is also stored at the source.

In a network environment, the user may transmit the source document 100 in a first format as source document data to a source network fax machine or device having suitable capabilities. The source network fax machine then interrogates the user source document data to determine the source format (document size and text orientation), accesses the conversion algorithm, and performs the conversion according to the conversion parameters provided in the look-up table. The source fax machine then transmits the converted document data to the destination machine. The destination machine then outputs or stores the document accordingly.

It is appreciated that the look-up table defines the relationship from the source document 100 to the output document 102 such that the ×5 document can be converted to other output document 102 sizes that provide a suitable output document format. Additionally, the example illustrates using a smaller source document 100 format to provide a larger output document 102.

The controller fax module retains the fax document in the original size, but in the standard paper size such as A4, B4, or Letter and the controller fax module is able to improve time to process the document. In addition, the recipient fax machine is able to save time and toner to print the document.

Figure 3:
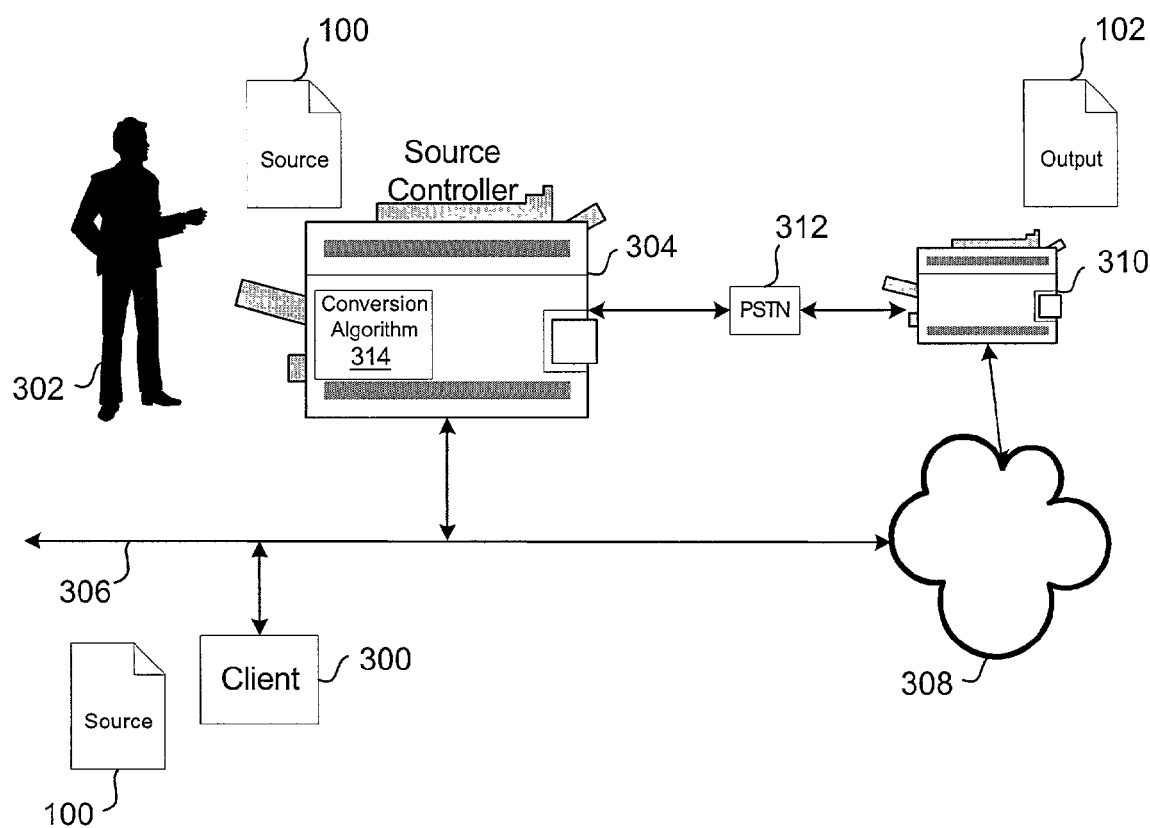
FIG. 3 illustrates a block diagram of a system utilizing the conversion architecture, according to a disclosed embodiment.

Referring now to FIG. 3, there is illustrated a block diagram of a system utilizing the conversion architecture, according to a disclosed embodiment. The source document 100 can be input in at least two ways: electronically via a network client 300; or manually, by the user 302 physically inserting the source document 100 into a controller 304. The controller 304 may be a network-based machine that communicates over a network 306 to provide services to the client 300 disposed thereon. The network 306 includes a LAN, WAN, etc., such that network communication can even be extended beyond to a global communication network (GCN) 308, an example of which is the packet-switched Internet.

A destination (or recipient) device 310 can be disposed on the GCN 308 in communication therewith to receive jobs from or transmit jobs to the source controller 304. Alternatively, the destination device 310 is operable in the conventional way of communicating fax jobs with the source controller 304 via the circuit-switched PSTN 312 (Public Switched Telephone Network). Still further, the recipient device 310 is operable to be both networked and connected to the PSTN 312.

Thus in operation, the source document 100 is input to the source controller 304, the image of which manipulated by a conversion algorithm 314 resident therein to provide the desired output document 102 in accordance with the conversion parameters described hereinabove.

Notably, the source controller 304 can be a multi-function device that accommodates, e.g., printing, copying, faxing, scanning, etc., such that corresponding control modules are resident therein to handle these various services upon request from the user, whether the user 302 or the client 300. Thus when a fax job is initiated, a fax module is accessed that includes the conversion algorithm 314 to complete the described conversion operation.

Although the preferred embodiment has been described in detail, it should be understood that various changes, substitutions, and alterations can be made therein without departing from the spirit and scope of the invention as defined by the appended claims.

What is claimed is:

1. A method of resizing a source document in a facsimile-capable device, comprising the steps of:
   inputting source document data representative of the source document into the facsimile-capable device;
   converting the source document data into a converted document with a converting algorithm resident in the facsimile-capable device; and
   transmitting the converted document to a destination device having predetermined output capabilities, which the converted document in processed into an output document by the destination device in accordance with the predetermined output capabilities,
   wherein the step of converting includes rotating image data of the converted document corresponding to the source document in accordance with the predetermined output capabilities of the destination device, and appending white space to the converted document in accordance with conversion information representative of the predetermined output capabilities of the destination device so that each page of the converted document is converted to a single corresponding page such that the converted document meets the predetermined output capabilities of the destination device.

2. The method of claim 1, wherein the source document data in the step of inputting is provided from a network client via a network.

3. The method of claim 1, wherein the source document data in the step of inputting is provided manually by a user inserting a document into a document receiving apparatus of a controller.

4. The method of claim 1, wherein when the source document data in the step of inputting represents document information in a portrait orientation, the document information is rotated counterclockwise ninety degrees.

5. The method of claim 1, wherein the source document data in the step of inputting represents that the source document has dimensions different from that of the output document.

6. The method of claim 5, wherein the source document is smaller in dimensions than the output document.

7. The method of claim 1, wherein the source document data in the step of inputting is representative of the source document having paper dimensions associated with of one of A5, B5, and Statement, and the corresponding paper dimensions of the output document are associated with one of A4, B4, and Letter.

8. The method of claim 1, wherein the facsimile-capable device includes a conversion algorithm resident therein for generating the converted document in the step of converting.

9. The method of claim 1, wherein the facsimile-capable device includes a conversion algorithm resident therein for processing the source document data to determine if the source document represented thereby is oriented in one of portrait and landscape format.

10. The method of claim 9, wherein the conversion algorithm includes a look-up table of conversion information that is accessed during the step of converting to determine a format for the output document.

11. The method of claim 1, wherein the white space appended in the step of appending matches the size of the output document.

12. The method of claim 1, wherein the converted document in the step of converting is processed in a landscape orientation.

13. The method of claim 1, wherein the converted document is transmitted to the device destination device in the step of transmitting, which destination device is a facsimile-capable device, via one of a circuit-switched network and packet-switched network.

14. The method of claim 1, wherein the converted document in the step of converting is retained in the facsimile-capable device.

15. A facsimile-capable controller, comprising:
input means for receiving into the controller source document data representative of a source document; and
a conversion algorithm resident in the controller for converting the source document data into a converted document by automatically resizing the source document in accordance with conversion information;
transmitting the converted document to a destination device having predetermined output capabilities, which the converted document in processed into an output document by the destination device in accordance with the predetermined output capabilities, and
wherein the conversion algorithm further comprises means adapted for rotating image data of the converted document corresponding to the source document in accordance with the predetermined output capabilities of the destination device, wherein white space is appended to the converted document in accordance with the conversion information representative of predetermined output capabilities of the destination device so that each page of the converted document is converted to a single corresponding page such that the converted document meets the predetermined output capabilities of the destination device.

16. The controller of claim 15, wherein the source document data is provided electronically from a network client via a network.

17. The controller of claim 15, wherein the source document data is provided manually by a user inserting a document into the input means that is a document receiving apparatus of the controller.

18. The controller of claim 15, wherein when the source document data represents that the source document is in a portrait orientation, the source document data is rotated counterclockwise ninety degrees.

19. The controller of claim 15, wherein the source document data represents that the source document has dimensions different from that of the output document.

20. The controller of claim 19, wherein the source document is smaller in dimensions than the output document.

21. The controller of claim 15, wherein the source document data is representative of the source document having paper dimensions associated with of one of A5, B5, and Statement, and the corresponding paper dimensions of the output document are associated with one of A4, B4, and Letter.

22. The controller of claim 15, wherein the conversion algorithm resident therein for processing the source document data determines if the source document represented thereby is oriented in one of portrait and landscape format.

23. The controller of claim 15, wherein the conversion algorithm includes a look-up table of the conversion information that is accessed to determine a format for the output document.

24. The controller of claim 15, wherein the appended white space matches the size of the output document.

25. The controller of claim 15, wherein the converted document is processed in a landscape orientation.

26. The controller of claim 15, wherein the converted document is transmitted to the device destination device, which destination device is a facsimile-capable device, via one of a circuit-switched network and packet-switched network.

27. The controller of claim 15, wherein the converted document is retained in the controller.

* * * * *